W. SHAKESPEARE, Jr.
ARTIFICIAL BAIT OR LURE.
APPLICATION FILED JUNE 29, 1910.
1,150,635. Patented Aug. 17, 1915.
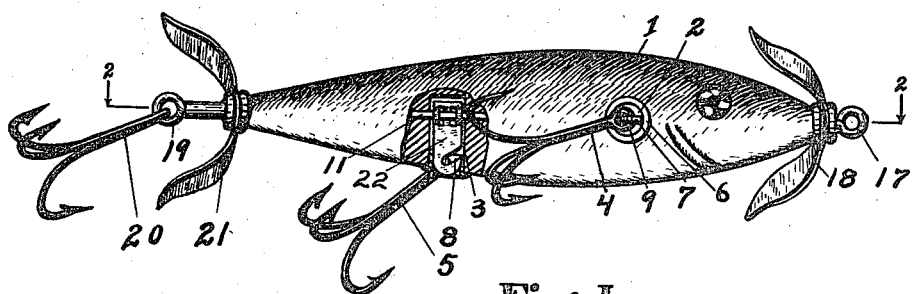
Fig. I.
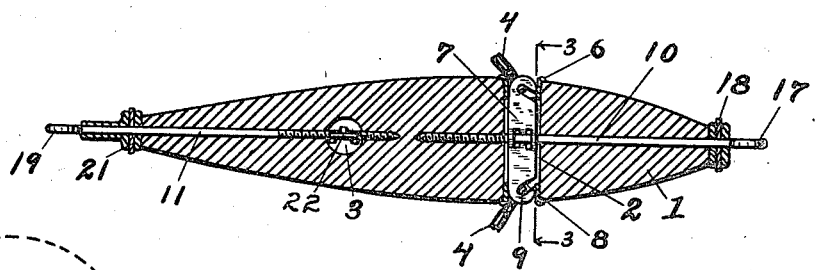
Fig. II.
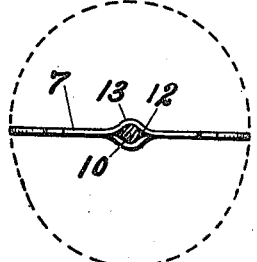
Fig. III.
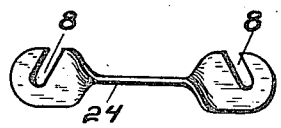
Fig. V.
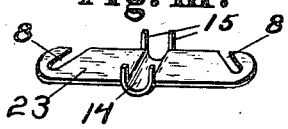
Fig. IV.
Fig. VI.
Fig. VII.
Inventor
William Shakespeare Jr.
By Chappell & Earl
Attorneys
Witnesses
L. G. Greenfield
F. G. Freeman

UNITED STATES PATENT OFFICE.

WILLIAM SHAKESPEARE, JR., OF KALAMAZOO, MICHIGAN, ASSIGNOR TO WILLIAM SHAKESPEARE, JR., COMPANY, OF KALAMAZOO, MICHIGAN.

ARTIFICIAL BAIT OR LURE.

1,150,635.  Specification of Letters Patent.  Patented Aug. 17, 1915.

Application filed June 29, 1910. Serial No. 569,503.

*To all whom it may concern:*

Be it known that I, WILLIAM SHAKESPEARE, Jr., a citizen of the United States, residing at Kalamazoo, Michigan, have invented certain new and useful Improvements in Artificial Baits or Lures, of which the following is a specification.

This invention relates to improvements in artificial baits or lures.

The main object of this invention is, to provide an improved artificial bait or lure in which the hooks are attached to the body so as to be readily and easily attached or removed.

Further objects and objects relating to structural details will definitely appear from the detailed description to follow.

I accomplish the objects of my invention by the devices and means described in the following specification. The structure described constitutes one effective embodiment of my invention.

Other embodiments would be readily devised by those skilled in the art.

The invention is clearly defined and pointed out in the claims.

A structure constituting an effective and preferred embodiment of the features of my invention is clearly illustrated in the accompanying drawing, forming a part of this specification, in which:

Figure 1 is a side elevation of a structure embodying the features of my invention, portions being broken away to show structural details. Fig. 2 is a longitudinal horizontal section taken on a line corresponding to line 2—2 of Fig. 1, portions being shown in full lines the better to illustrate their structure. Fig. 3 is an enlarged vertical section taken on a line corresponding to line 3—3 of Fig. 2, the body being indicated in dotted lines. Fig. 4 is a perspective view of a modified form of the hook attaching member. Fig. 5 is a plan view of another modification of the hook attaching member. Fig. 6 is an elevation view of the hook attaching member shown in Fig. 5. Fig. 7 is a plan view of a still further modification of the hook attaching member.

In the drawings similar reference characters refer to similar parts throughout the several views and the sectional views are taken looking in the direction of the little arrows at the ends of the section lines.

Referring to the drawings, the body 1 of my improved bait or lure is, in the structure illustrated, shaped like a minnow and may be suitably decorated as desired. The body is provided with transverse openings, as 2 and 3, the opening 2 being adapted to receive the attaching member for the side hooks 4, while the opening 3 is adapted to receive the attaching member for the body hook 5. I desire to remark that some baits are provided with side hooks only, some with bottom hooks only, and some with both, as the structure illustrated.

The openings are preferably provided with socket rings 6. The hook attaching member 7 is provided with slots 8 at its ends, adapted to receive the eyes 9 of the hooks. These slots in effect form hooks at the ends of the attaching member, adapted to engage the hook eyes.

The attaching members are preferably integral sheet metal stampings, and are adapted to quite closely fit the openings in the bait body, so that the slots, or, in other words, the hook openings, are closed to prevent the disengagement of the hooks when the attaching members are secured in the body openings, as will be obvious from the drawings.

The sockets 6 are preferably adapted to embrace the ends of the attaching members quite closely. The attaching members are removably secured in the openings as by means of the rods 10 and 11, which are arranged transversely through the openings to engage the attaching members, which are provided with eyes as 12, the eyes in the preferred construction being formed by offsetting strap-like loops 13. The attaching member 22 for the hook 5 is structurally the same as the attaching member 7 with one end thereof cut off. In the modified construction shown in Fig. 4, the body of the attaching member 23 is offset at 14, and provided with lugs 15 between which the retaining rods are passed, so that the attaching member is retained in the body opening.

In the modified construction shown in Figs. 5 and 6, the central portion of the attaching member 24 is given a quarter twist and provided with a perforation 16 to provide the rod engaging eye.

In the modification shown in Fig. 7, the hooks of the attaching member 25 are supported in an upright or vertical position. The horizontal position, however, of the attaching members as shown in Figs. 1 to 6 inclusive, is preferred, as the hooks are supported more effectively when these attaching members are disposed in a horizontal position. The rod 10 is also preferably adapted to serve as a line attaching means, it being provided with an eye 17 at its forward end, and also as a support for the forward spinner 18. The rod 11 is provided with an eye 19 for the trailing hook 20, and is also adapted to support the rear spinner 21.

I have illustrated and described my improved bait or lure in detail in the form in which I have embodied the same and in the form in which it is at present being marketed. I am aware, however, that my invention is capable of considerable variation in structural details without departing from my invention and I desire to be understood as claiming the same specifically in the form illustrated, as well as broadly within the scope of the appended claims.

Having thus described my invention, what I claim as new and desire to secure by Letters Patent, is:

1. In an artificial bait, the combination of a body having a transverse opening therein; a removable rod arranged transversely through said opening; fish hooks; and a hook attaching member having open hooks at its ends, adapted to receive the eyes of the fish hooks, and an eye adapted to receive said rod whereby said attaching member is retained in said body opening, said member being freed for longitudinal movement in the body opening when said rod is removed to permit the engaging and disengaging of the hooks, said attaching member being an integral sheet metal stamping slotted to form said engaging hooks, the openings of the engaging hooks being closed by the walls of the body opening when the attaching member is engaged by the rod and located near the side walls of the body when the attaching member is in operative position so that a slight lateral displacement of the attaching member will permit the direct application or removal of a hook.

2. In an artificial bait, the combination of a body having a transverse opening therein; a fish hook; a sheet metal hook attaching member formed with an open slot adapted to receive the eye of the fish hook; and means for removably securing said attaching member in said opening, said member being freed for longitudinal movement in the body opening when its securing means is disengaged therefrom to permit its being withdrawn from the body and the hook being engaged or disengaged, the hook of the attaching member being closed by the wall of the body opening to prevent the disengagement of the hook when the attaching member is in position in said body opening and located near the side walls of the body when the attaching member is in operative position so that a slight lateral displacement of the attaching member will permit the direct application or removal of a hook.

In witness whereof, I have hereunto set my hand and seal in the presence of two witnesses.

WILLIAM SHAKESPEARE, JR. [L. S.]

Witnesses:
LUELLA G. GREENFIELD,
M. P. WOODRUFF.